Sept. 22, 1931.  C. J. LOEHR  1,824,557
AUTOMATIC TRAP NEST
Filed March 21, 1927  4 Sheets-Sheet 1

INVENTOR.
C. J. LOEHR
BY
ATTORNEY.

Patented Sept. 22, 1931

1,824,557

UNITED STATES PATENT OFFICE

CHARLES J. LOEHR, OF LOS ANGELES, CALIFORNIA

AUTOMATIC TRAP NEST

Application filed March 21, 1927. Serial No. 176,933.

This invention relates to trap nests.

The general object of this invention is to provide an improved trap nest.

A specific object of this invention is to provide a trap nest adapted for ordinary commercial use and which may be used for professional breeding when desired.

An additional object of my invention is to provide a trap nest having two doors and means operable by a hen to selectively actuate the doors.

Another object of this invention is to provide a trap nest of the class described wherein all the working parts are below the laying nest.

A further object of the invention is to provide a trap nest with an entrance door and an exit door, wherein means is provided for holding the doors shut and wherein if no egg is laid the hen may at will return through the entrance door and wherein upon laying an egg the hen may pass through the exit door.

Still another object of this invention is to provide novel means for inducing the hen, on entering and leaving the nest to actuate the doors of the nest.

Another object of the invention is to provide a novel form of egg tripped door retaining latch mechanism.

Another object of this invention is to provide a novel means for converting a trap nest device from an ordinary commercial trap nest to a professional breeding trap nest.

A further object of this invention is to provide a novel form of nest for use with my improved trap nest.

Other objects and advantages of this invention will be apparent from the following description taken in connection with the accompanying drawings wherein.

Figures 1, 2, 5, 9, 10:
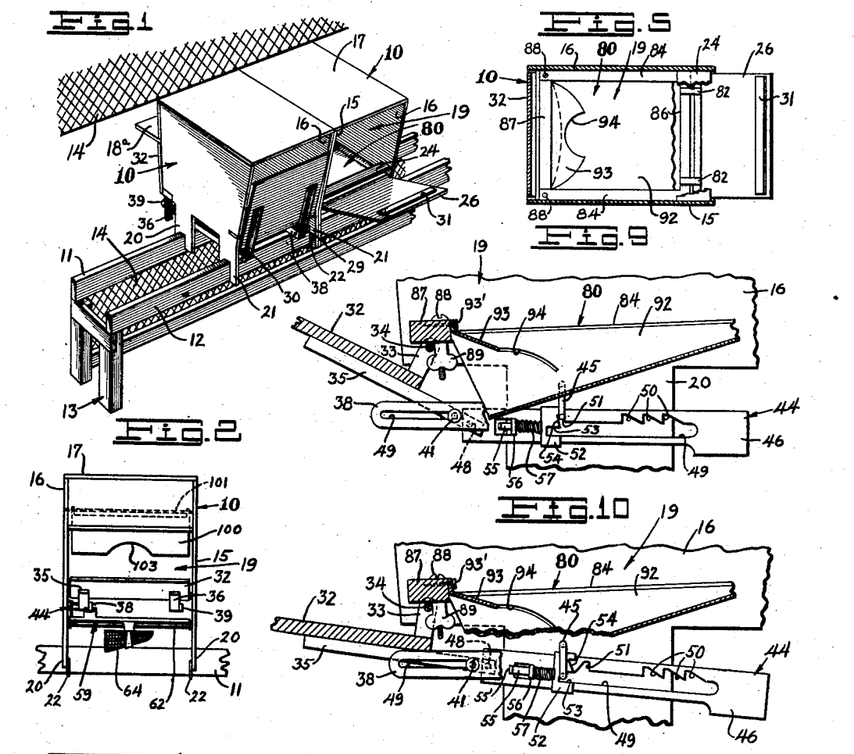
Fig. 1 is a perspective view of a plurality of my improved trap nests arranged in battery formation.
Fig. 2 is a rear view of a single trap nest showing the exit door open.
Fig. 5 is a section through the trap nest taken on line 5—5 of Fig. 3.
Fig. 9 is a view of the exit door latch mechanism in a position corresponding to the position of the exit door as shown in Fig. 7.
Fig. 10 is a view of the exit door latch mechanism in a position corresponding to the position of the exit door as shown in Fig. 8.

Referring to the drawings by reference characters I have indicated my improved trap nest generally at 10. These trap nests may be arranged in any desired manner in groups or batteries as shown in Fig. 1 of the drawings. As shown in Fig. 1 the trap nests 10 are arranged side by side and supported on rails 11 and 12 of a frame 13. The area outside of the trap nests 10 between the entrance and exit doors is preferably divided as by a partition of wire mesh 14.

In the commercial chicken business it is particularly desirable to know for a certainty which of the hens are laying and which are not so that the drones may be weeded out, and for professional breeding it is very desirous to have an efficient trap nest whereby each egg laid can be positively identified with the hen which laid it and for these two purposes this invention is particularly adapted.

My trap nest 10 includes side walls 15, 16, a top member 17 and a partial back 18 (see Fig. 3) arranged to form a chamber 19. Protruding outwardly from the rear wall 18 I provide a shelf-like member 18$^a$ having an aperture 18$^b$ (Fig. 6) therein adjacent the rear wall 18. The side walls 15 and 16 may extend downwardly to form legs 20 and 21 which are adapted to be positioned on the rails 11 and 12 of the frame 13 by providing a slot in the legs. The trap nests may be secured to the rails 11 and 12 as by a resilient catch shown at 22 or in any other suitable manner.

Adjacent one end of the nest I provide a transverse member or perch 24 which fits within a notch 25 in either of the side walls 15 and 16 and which may be either secured to the side walls to form a brace or be removable for the purpose which will be explained hereinafter.

The entrance end of the chamber 19 is adapted to be closed by a door 26 having bracket members 27 adjacent each side thereof which are adapted to pivot on a transverse rod 28 supported by the side walls 15 and 16. The door is also provided with arms 29 and 30 which extend therefrom adjacent its pivoted end and with a cleat 31 adjacent its free end which also acts as a gripping member for a hen stepping on the door.

The exit end of the chamber 19 is adapted to be closed by a door 32 having bracket members 33 thereon adjacent each end which are adapted to pivot on a transverse rod 34 supported by the walls 15 and 16. The door 32 is also provided with arms 35 and 36 extended therefrom adjacent its pivoted end and a cleat 37 adjacent its free end which acts as a gripping member for a hen standing on the door. A stop 32$^a$ for the door 32 is secured to the rear wall 18 to intercept the closing movement of the door.

The arms 29 and 30 of the entrance door 26 have bars 38 and 39 pivotally secured thereto as at 40. These bars extend rearwardly and are slackly connected to the arms 35 and 36 of the exit door 32 by providing pins 41 on the arms 35 and 36. Each pin is adapted to work in a slot 42 provided in each of the bars 38 and 39.

To add weight to the exit door 32, I provide a counterweight 43 adjacent the free end of one of the arms 35 and 36, shown in this instance as being secured to the arm 36. This counterweight I deem of particular importance as it enables me to nicely control the doors.

Secured to the arm 35 of the exit door 32 I provide a trigger mechanism indicated generally at 44 adapted to coact with a stationary U-shaped member or staple 45 for holding the exit door 32 in various positions. The staple 45 is shown as secured to the leg 20. The trigger 44 comprises a flat body portion 46 of metal pivotally secured to the arm 35 at 48 and having an elongated aperture 49 therein which has in its upper surface a plurality of toothed notches 50 and a notch 51 (see Fig. 10). The plurality of notches 50 are provided to compensate for any chance irregularity in the placement of the staple 45 and for other purposes.

Slidably mounted on the body 46 of the trigger I mount a catch 52 (see Figs. 9, 10 and 12) having a slot 53 on its front edge and a notch 54, and provided at its rear edge with an extended tongue 55. The tongue 55 is slidably mounted in an outstruck lug 56 of the body 46. For normally holding the catch 52 in a forward position I provide a spring 57. The forward movement of the catch is limited by an upturned lip 55' on the tongue 55 (see Fig. 12).

For actuating the trigger mechanism 44 I provide a trip indicated generally at 59. This trip comprises a flat body portion 60 having downturned lips 61 adjacent each end thereof which are pivoted adjacent the side walls 15 and 16 on a rod 62 which is supported in the side walls 15 and 16, (see Fig. 3). The end of the body 60 adjacent the side wall 16 is bent upwardly to form a lip 62$^a$ which is positioned between the side wall 16 and the body 46 of the trigger. This lip prevents the trigger mechanism 44 and the trip 59 from becoming disassociated from each other, thus preventing any possibility of the trip not actuating the trigger mechanism.

Figure 6:
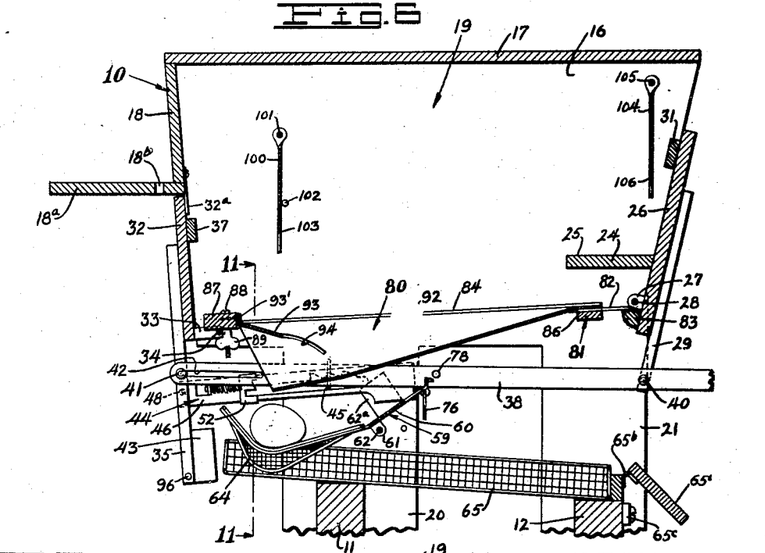
Fig. 6 is a longitudinal vertical section through my device showing the same in the position it will automatically assume when a hen is on the nest and further shows the egg trip actuated by an egg.

Protruding rearwardly from the body 60 I provide a tongue 63 to which I secure a basket 64 adapted to receive an egg and deliver it upon the tilting of the trip 59 to an egg tray 65, which is preferably placed directly therebeneath and supported on the rails 11 and 12 of the frame 13. The egg tray 65 may be protected from inquisitive fowls by providing on the rail 12 a door 65ª hinged at 65ᵇ and adapted to be retained in an upright position by an arm 65ᶜ pivoted at 65ᵈ. The arm 65ᶜ may be turned to a horizontal position as shown in Fig. 6 to allow the door 65ª to be swung open for the removal of eggs from the tray 65.

The basket 64 is shown as provided with a flap 66 hinged to the basket as by binding it thereto by wires and adapted to be normally held against the under side of the basket as by a bent wire 67 or in any other suitable manner. The purpose of this flap 66 will be more fully explained hereinafter.

Figure 3:
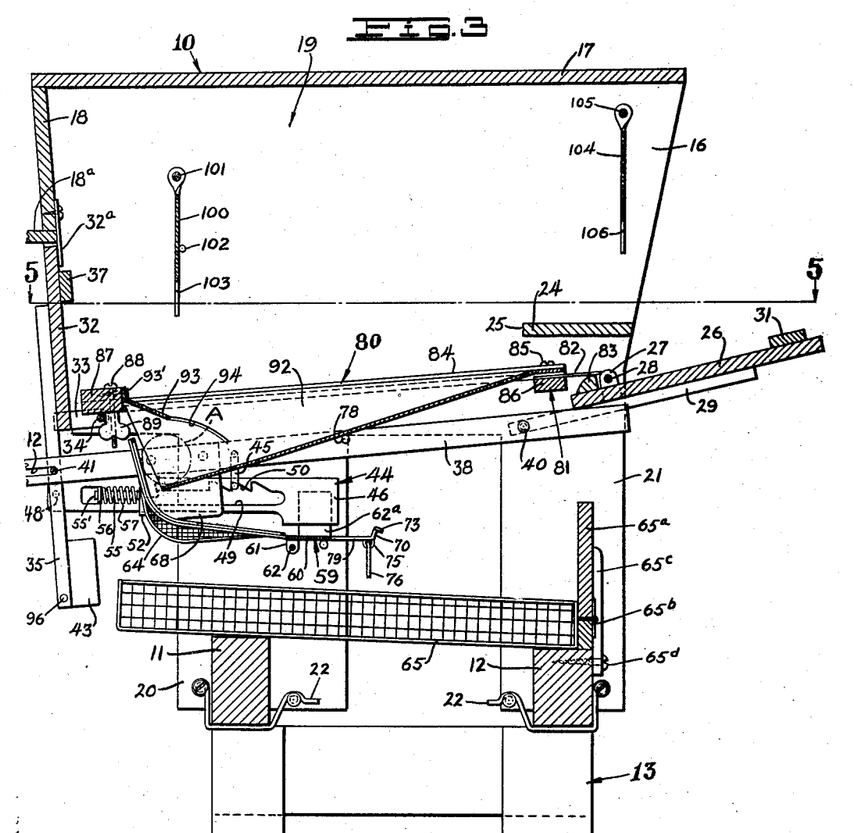
Fig. 3 is an enlarged longitudinal vertical section through one of my improved trap nests showing the same in a position for the entrance of a hen.
Figure 4:
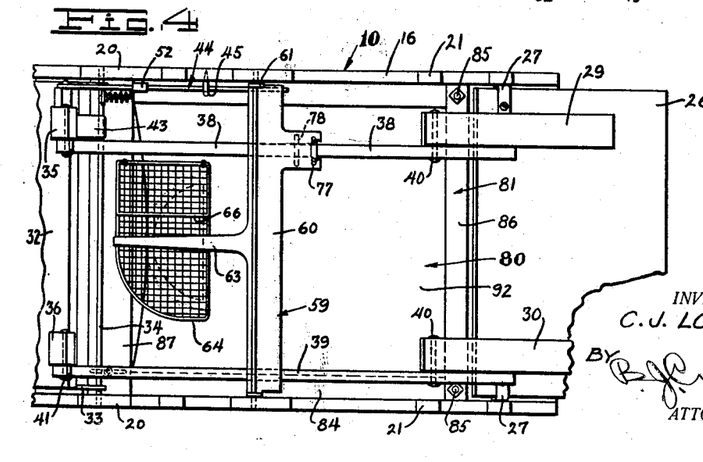
Fig. 4 is a bottom plan view of my device showing the various working parts thereof.
Figure 11:
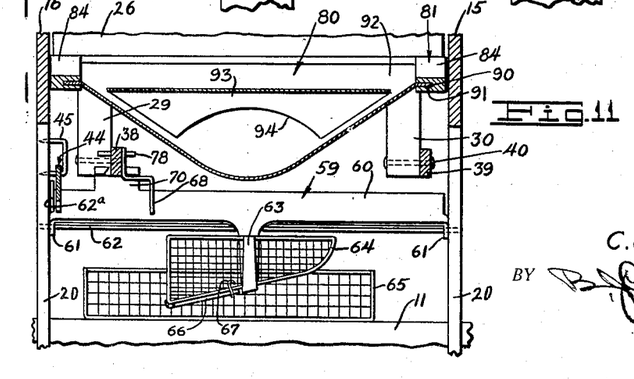
Fig. 11 is a transverse section taken on line 11—11 of Fig. 6.

To prevent an egg from rolling out of the basket 64 until after the trip 59 has actuated the trigger mechanism I provide an arm 68 on the bar 38 as shown in Figs. 3 and 11 or in any other suitable manner. This arm may be secured to the bar 38 in any desired manner and is positioned adjacent the lowermost or discharge end of the basket 64. To more clearly show other parts of the invention the arm 68 is not shown in any views other than Figs. 3 and 11.

Figure 13:
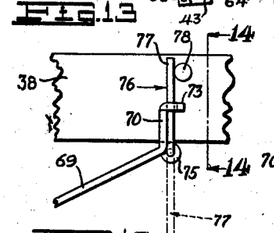
Fig. 13 is an enlarged detail view of the yoke carrying portion of the trip mechanism.
Figure 14:
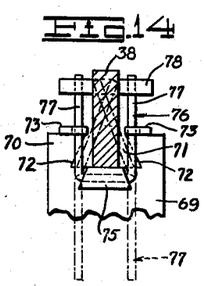
Fig. 14 is a vertical section taken on line 14—14 of Fig. 13.
Figure 15:
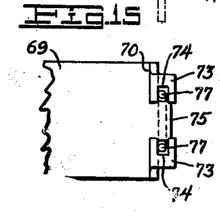
Fig. 15 is a top plan view of Fig. 13.

Extending forward from the body 60 of the trip 59 I provide another tongue 69 bent upwardly at its free end to form a lip 70 (see Figs. 13, 14 and 15) which has a slot 71 provided with inclined side walls 72. The lip 70 is bent adjacent the top on either side of the walls 72 to form projections 73, each of which are provided with a slot 74. The material which is cut out to form the slot 71 is bent to form a bearing 75 in which I pivotally mount a semi-resilient yoke 76 having parallel side bars 77. The side bars 77 of the yoke are normally adapted to hang down in an inoperative position as shown by the broken lines in Fig. 13 and are adapted to be placed in an operative position in the slots 74 of the projections 73 as shown in full lines by grasping their free ends and bringing them together as shown by the broken lines in Fig. 14, so that they will clear the sides 72 of the slot 71 and move behind the projections 73.

The purpose of this yoke mechanism will be more fully described hereinafter. This yoke mechanism also serves as a counterweight to normally urge the basket 64 in a receptive position. In the bar 38 and extending therethrough, I provide a pin 78 adapted to coact with the yoke 76 in a manner which will be more fully explained hereinafter.

Within the previously mentioned chamber 19 I provide a laying nest indicated generally at 80. This nest includes a frame 81 supported adjacent the rear thereof on the transverse rod 34 and adjacent the front end by tongues 82, which rest on a transverse bar 83 of the entrance door 26.

The frame includes parallel side bars 84 each pivotally secured as at 85 to a front transverse bar 86 and removably attached to a rear transverse bar 87 by bolts 88 provided with wing nuts 89 on the under side of the bar 87. The tongues 82 are secured to the front bar 86 in any desired manner and support the front of the nest. The rear bar 87 rests on the transverse rod 34 as previously mentioned and the body portion of the wing nuts 89 abut the front portion of the rod 34 and prevent any rearward movement of the nest frame.

Figure 19:
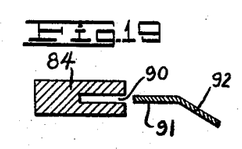

The side bars 84 of the frame are provided with grooves 90 in which side flanges 91 of the nest body 92 are adapted to be positioned (see Fig. 19). The body 92 slopes toward the longitudinal center of the nest and towards the rear where it is left open. To partly obstruct the rear opening of the nest I provide a baffle plate 93 which is provided with an aperture 94 of sufficient size to allow an egg to pass therethrough. This baffle plate 93 is removably secured by members 93' to the rear transverse bar 87 of the frame 81 and is so positioned as to place the most rearward portion of the aperture 94 in advance of the rear extremity of the body 92. This prevents an inquisitive hen from protruding her head through the aperture 94 and actuating the trigger mechanism 44 and it also prevents her feet from accidentally actuating the trigger mechanism.

The body 92 of the nest and the baffle plate 93 are preferably made of a semi-resilient fibrous material such as ordinary cardboard impregnated with material such as formaldehyde but may be made of any other material suitable for the purpose. The entire nest 80 may be removed from the chamber 19 for cleaning, fumigating or for replacing the body 92.

Figure 18:
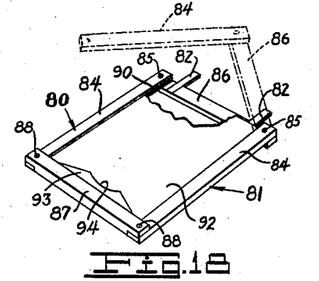
Fig. 18 is a perspective view of the laying nest showing it removed from the trap nest and Fig. 19 is an enlarged cross section through one of the nest frame side bars showing a portion of the nest body about to be placed in the groove of the bar.

To replace the body 92 one of the wing nuts 89 and one of the bolts 88 is removed and then the frame 81 may be opened as shown by the broken lines in Fig. 18. When the frame is open the old body 92 may be removed and a new one placed in position in the frame, the frame closed and secured again by the bolt and wing nut and the nest 80 replaced in the chamber 19.

Within the chamber 19 and extending transversely thereof I may provide adjacent the exit a curtain 100 pivotally hung from a transverse rod 101 and restricted from forward movement by pins 102 in the side walls 15 and 16. The lower edge of this curtain is provided with a cut away portion 103 (see Fig. 2). Also if deemed necessary I may provide adjacent the entrance a similar curtain 104 pivotally hung from a transverse rod 105 and provided in its lower edge with a cut away portion 106 similar to the cut away portion 103 of curtain 100. Unlike the exit curtain 100 the entrance curtain is free to swing either rearwardly or forwardly.

When the trap nest 10 is set up for operation as shown in Fig. 3, the exit door 32 is in a closed position and the entrance door 26 is in an open position, and the trigger mechanism 44 and basket 64 assume the positions shown in Fig. 3. When in this position the staple 45 is adapted to be positioned in one of the notches 50 of the trigger mechanism to prevent the exit door 32 from swinging open.

When a hen desires to enter the trap nest she jumps upon the open entrance door 26, steps upon or over the perch 24 and thence into the nest 80. When the hen rests upon the nest 80 the front end of which is supported on the bar 83 on the door 26 the latter moves about the rod 28 and swings to a closed position as shown in Fig. 6. If the hen does not lay an egg, she will, when she desires to leave the nest, look above the top edge of the entrance door and step upon the perch 24, thus removing her weight from the nest 80, the front end of which will then rise and allow the entrance door to swing to an open position whereupon the hen may depart from the trap nest.

If the hen does lay an egg the egg will roll down the incline of the nest and strike against the basket 64 as shown in dotted lines at A in Fig. 3. When the egg comes to rest against the rear of the basket 64 its weight will cause the basket which is nicely balanced to lower, thus tilting the trip 59 so that a portion of the body 60 strikes against the lower edge of the trigger mechanism 44 and tilts it upwardly to move the notch 50 away from the staple 45 as shown in Fig. 6.

Figures 7, 8, 12:
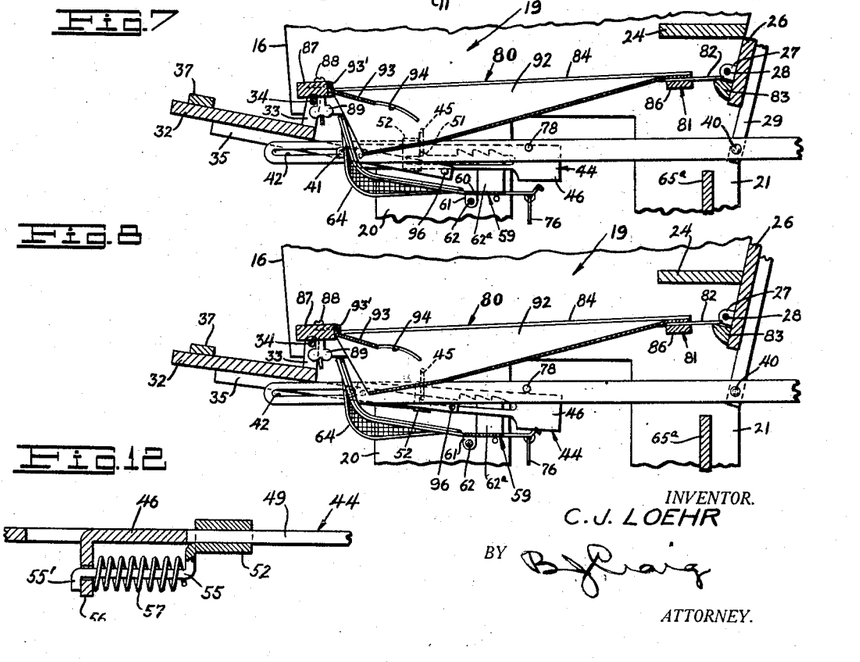
Fig. 7 is a fragmentary longitudinal vertical sectional view showing the exit door of my device open to allow the hen to depart therefrom.
Fig. 8 is a view similar to Fig. 7 showing my device in the position it assumes when the departing hen rests her weight on the exit door.
Fig. 12 is a longitudinal plan section through the catch mechanism and a portion of the trigger.

When the trigger mechanism 44 is released from the staple 45 the exit door 32 swings open, with the pin 41 moving in slots 42 and the trigger mechanism 44 assumes the position shown in Figs. 7 and 9. In this position the staple 45 is disposed in the notch 51 and the trigger mechanism 44 is prevented from further forward movement by the inclined wall of notch 54 in the catch 52 abutting the staple 45. The spring 57 is strong enough in this partially compressed position to prevent any further movement of the door 32 until the departing hen steps upon the door. When the basket tilts and actuates the trigger mechanism 44 the egg rolls out of the basket and is deposited in the egg tray 65. Due to the weight on the arm of the exit door, at this point resistance is offered which allows the trigger mechanism to function.

As the hen steps upon the exit door 32 her weight moves it farther down consequently forcing the trigger mechanism 44 farther forward to the position shown in Figs. 8 and 10. As the trigger mechanism is moved farther forward the catch 52 is forced rearward against the action of the spring 57 and the trigger rides up on the inclined surface of notch 51 to release it from the staple 45 and position it in the notch 53 of the catch 52.

When the hen leaves the exit door 32 upon release of her weight therefrom, the counterweight 43 will cause the rear door to turn about the rod 34 to close which action through the medium of bars 38 and 39 will enable the entrance door 26 to open again so that another hen may enter the trap nest.

As the exit door closes and the trigger mechanism 44 moves rearwardly urged by the spring 57 the staple 45 is retained in the notch 53 of catch 52 until the notch 51 passes the staple whereupon it is disposed in the elongated slot 49 of the body 46 and positioned in one of the notches 50 when the trigger 44 reaches the limit of its rearward movement, thus becoming set again to function when another egg is deposited in the basket 64.

Figure 16:
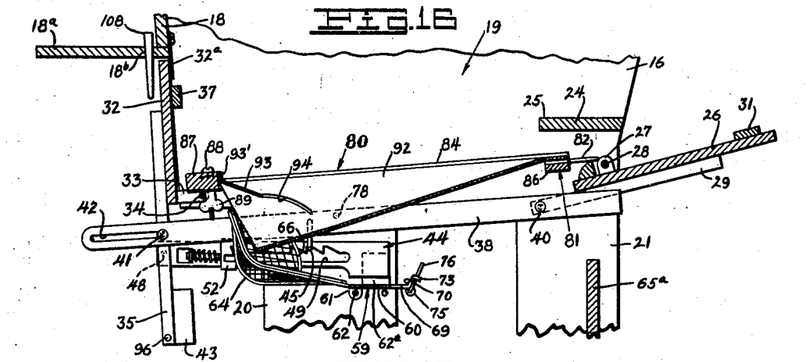
Fig. 16 is a fragmentary vertical longitudinal section through the trap nest showing the parts thereof arranged to trap a laying hen in the nest for identifying her egg.

As shown in Figs. 3 and 16 of the drawings the entrance door 26 is restricted from further downward movement when in an open position by the coaction of the pivot 40 and the rear edge of the door abutting the bars 38 and 39 and by the rod 28. The exit door when in a full open position as shown in Fig. 8 is prevented from further downward movement by providing pins 96 adjacent the lower ends of the arms 35 and 36 which are adapted to abut the under side of the bars 38 and 39.

As the hen leaves the chamber 19 and stands upon the exit door 32 the shelf-like member 18ª will not allow her to stand erect so consequently she will be compelled to put her full weight upon the door thereby releasing the trigger mechanism. Also the member 18ª prevents any other inquisitive hen from flying upon the exit door and releasing the trigger while the laying hen remains in the nest.

When the curtain 100 is in place across the chamber 19 a departing hen must lower her head to pass therebeneath but when a portion of the hen strikes the curtain it will swing upward and rearwardly and allow her to pass. After the hen has passed the curtain it will swing down again and the pins 102 will present it from swinging forward thus preventing the hen from re-entering the nest.

The entrance curtain 104 is placed above the perch 24 and will rest on the back of an entering or non-laying departing hen, making her uncomfortable and thus causing her to either enter or depart from the trap nest.

Figure 17:
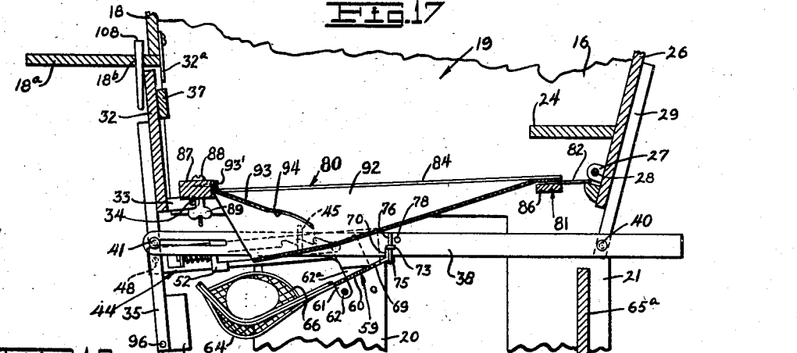
Fig. 17 is a view similar to Fig. 16 showing the entrance door held closed by the tilting of the trip mechanism.

When the trap nest is to be used to retain a laying hen therein for the purpose of identifying the egg as previously set forth the yoke 76 is positioned in the slots 74 of the projections 73 of the lip 70 which is formed on the tongue 69 of the trip mechanism 59 as shown in Figs. 13 to 17 inclusive. A pin 108 is placed in the aperture 18ᵇ of the shelf 18ᵃ and the flap 66 of the egg basket 64 is raised to form an obstruction across the discharge end of the basket as shown in Figs. 16 and 17.

When the entrance door 26 is open as shown in Fig. 16 the hen may enter the nest causing the entrance door to close as previously described and if she does not lay an egg she may depart from the trap nest as previously described through the entrance door. If the hen does lay an egg it rolls down the nest and is deposited in the egg basket 64, which will, as previously set forth, trip the trigger 44 and release the exit door 32. The pin 108 prevents the exit door from opening as shown in Fig. 17 and the arms 77 of the yoke 76 having been moved upwardly by the tilting of the trip 59 are positioned in the path of the pin 78 on the bar 38 and prevent the entrance door 26 from opening when the hen tries to depart from the trap nest.

If it is desired to retain a hen in the trap nest whether she lays an egg or not the perch 24 may be removed, the pin 108 placed in the aperture 18ᵇ and then the hen's weight on the nest 80 will keep the entrance door 26 closed and the pin 108 will prevent the exit door 32 from opening.

It will be noted from the foregoing description that the back door does not depend on any other means for its closing. The manner of mounting this door allows for a sudden drop of the door against the counterweight which is on the bottom of the door. From the momentum the upper part of the door falls far enough to allow the locking mechanism to hold the door in a partly open position, thereby leaving a greater weight on the lower part of the door in said position than there is on the upper part of said door, so that when a hen's weight is removed from the door in this position, the counterweight counterbalances the upper part of the door and this returns the door toward its closing position. The force is sufficient to bring the door to a vertical position where it is locked.

My improved trap nest may also be employed to retain therein a non-laying hen and release a laying hen. To operate the trap nest for this purpose the perch 24 is removed and as the hen steps upon the nest 80 the entrance door will be closed as previously described. If the hen does not lay an egg she cannot depart from the trap nest because her weight will retain the entrance door in a closed position. But if the hen does lay an egg it will actuate the trigger mechanism 44 as previously described to free the exit door 32 and allow it to open whereupon the hen may depart from the trap nest as previously described. After the hen's weight is removed from the exit door 32 it will automatically close and allow the entrance door 26 to open whereupon the trap nest is set for another hen.

The back of the nest is practically stationary while the front of the nest needs to move through an arc of only approximately three-quarters of an inch in length due to its free action. This is in contrast with old types of pivoted nests which move as much as three inches.

It will be understood that the material of which the various parts of my improved trap nest are made may be wood, metal or composition, although the material forms no part of the invention.

From the foregoing description it will be apparent that I have provided a novel trap nest which is sturdy, economical and efficient in operation and which may be used in a variety of ways for different purposes.

What I claim is:

1. A trap nest including a receptacle, a laying nest in said receptacle, an entrance door to said receptacle, an exit door from said receptacle, a trigger mechanism associated with said exit door, a spring associated with said trigger for moving said trigger in one direction, said trigger mechanism being adapted to retain said exit door in both a closed position and in a partly open position, and egg operated means adapted to actuate said trigger mechanism to cause said exit door to move to partly open position.

2. A trap nest including a receptacle, a laying nest in said receptacle, an entrance door to said receptacle, an exit door from said receptacle, a trigger mechanism including coacting sliding members and spring means for actuating said members, means connecting said mechanism and said exit door to operate said door, said mechanism being arranged beneath said laying nest, said trigger mechanism being adapted to retain said exit door in a closed position and in a partly open position, a trip adapted to actuate said trigger mechanism to allow said exit door to move to partly open position, said trip being adapted to be actuated by an egg laid by a hen in said laying nest and means to guide an egg from said nest to said trip.

3. In a trap nest including a receptacle, an entrance door for said receptacle, an exit door for said receptacle, a latch mechanism associated with said exit door, a laying nest in said receptacle, means whereby the weight of a hen upon said nest closes said entrance door, means whereby a hen not laying an egg may depart from said nest through said entrance door, means whereby an egg laid by a hen in said laying nest will actuate said latch to unlock said exit door which will automatically assume a partly open position and means whereby when said exit door is in said partly open position it will automatically retain said entrance door in a closed position.

4. A trap nest including a receptacle, a laying nest in said receptacle, an entrance door for said receptacle, means to retain said entrance door in a closed position by the weight of a hen in said laying nest, an exit door for said receptacle, an exit door control mechanism associated with said exit door and adapted to retain said exit door in a closed position, egg operated means adapted to actuate said door control mechanism to allow said exit door to move to partly open position, a catch mechanism associated with said door control mechanism adapted to retain said exit door in a partly open position after said egg operated means has been actuated, means to release said catch mechanism by movement of said exit door through the weight of a hen upon said exit door and means to open said entrance door and close said exit door.

5. In a trap nest, a support, a laying receptacle, a laying nest pivotally mounted in said receptacle, an entrance door pivotally mounted, an exit door pivotally mounted, means connecting said entrance door and said nest whereby movement of said nest about its pivot will close said entrance door, a perch adjacent said entrance door and between said nest and said door, and means to control movement of said exit door, said means including a trigger mechanism, said means including an egg receiving trip, said trip serving to release said trigger through the weight of an egg thereon and allow said exit door to move to an open position automatically by its own weight, and means whereby when said exit door is opened said entrance door is temporarily held closed by said exit door.

6. A trap nest including a chamber, a laying nest in said chamber, an entrance door at one end of said chamber adapted to be closed and retained in a closed position by the weight of a hen in said laying nest, an exit door at the other end of said chamber, a trigger mechanism associated with said exit door and adapted to retain said exit door in a closed position, a trip adapted to actuate said trigger mechanism to allow said exit door to open, said trip being adapted to be actuated by an egg laid by a hen in said laying nest, a catch mechanism associated with said trigger mechanism adapted to retain said exit door in a partly open position after said trigger has been actuated by said trip, said catch being released by the weight of a hen upon said exit door and means whereby when the weight of said hen is removed from said exit door said door will automatically close.

7. A trap nest including a receptacle, a laying nest in said receptacle, an entrance door at one end of said receptacle, means to retain said door in a closed position by the weight of a hen in said laying nest, an exit door at the other end of said receptacle, a trigger mechanism associated with said exit door and adapted to retain said exit door in a closed position, a trip adapted to actuate said trigger mechanism to allow said exit door to open, said trip being adapted to be actuated by an egg laid by a hen in said laying nest, a catch mechanism associated with said trigger mechanism adapted to retain said exit door in a partly open position after said trigger has been actuated by said trip, said catch being releasable by the weight of a hen upon said exit door whereby when the weight of said hen is removed from said exit door said door will automatically close.

8. A trap nest including a receptacle, a laying nest in said receptacle, an entrance door for said receptacle, means to retain said door in a closed position by the weight of a hen in said laying nest, an exit door at the other end of said receptacle, a trigger mechanism associated with said exit door and adapted to retain said exit door in a closed position, a trip adapted to actuate said trigger mechanism to allow said exit door to open, said trip being adapted to be actuated by an egg laid by a hen in said laying nest, a catch mechanism associated with said trigger mechanism adapted to retain said exit door in a partly open position after said trigger has been actuated by said trip, said catch being releasable by the weight of a hen upon said exit door whereby when the weight of a hen is removed from said exit door said door will automatically close, means connecting said entrance door and said exit door whereby upon the closing of said exit door said entrance door will automatically be opened.

9. A trap nest including a receptacle, a laying nest in said receptacle, a trigger mechanism associated with said exit door, said exit door being pivoted to move of its own weight to an open position, said trigger mechanism being adapted to retain said exit door in both a closed position and a partly open position, egg operated means adapted to actuate said trigger mechanism to cause said exit door to move to a partly open position, said trigger mechanism being adapted to retain said exit door in a partly open position and to prevent said exit door from closing until after said exit door is moved to a fully open position.

10. A trap nest including a receptacle, a laying nest in said receptacle, an entrance door for said receptacle, means to retain said entrance door in a closed position, an exit door for said receptacle, an exit door control mechanism associated with said exit door and adapted to retain said exit door in a closed position, egg operated means including a catch mechanism adapted to actuate said door control mechanism to allow movement of said exit door, means to release said catch mechanism by movement of said exit door through the weight of a hen upon said exit door and means below said nest connecting said entrance door and said exit door to open said entrance door and close said exit door.

11. A trap nest including a receptacle having a laying nest and an entrance door, an exit door, a trigger mechanism associated with said exit door and adapted to retain said exit door in a closed position, a trip adapted to release said trigger mechanism to allow said exit door to open, a catch mechanism associated with said trigger mechanism adapted to retain said exit door in a partly open position after said trigger has been actuated by said trip, said catch being releasable by movement caused by the weight of a hen upon said exit door.

In testimony whereof, I hereunto affix my signature.

CHARLES J. LOEHR.